(No Model.)
G. OSBORNE.
BICYCLE ATTACHMENT.
No. 599,790.     Patented Mar. 1, 1898.
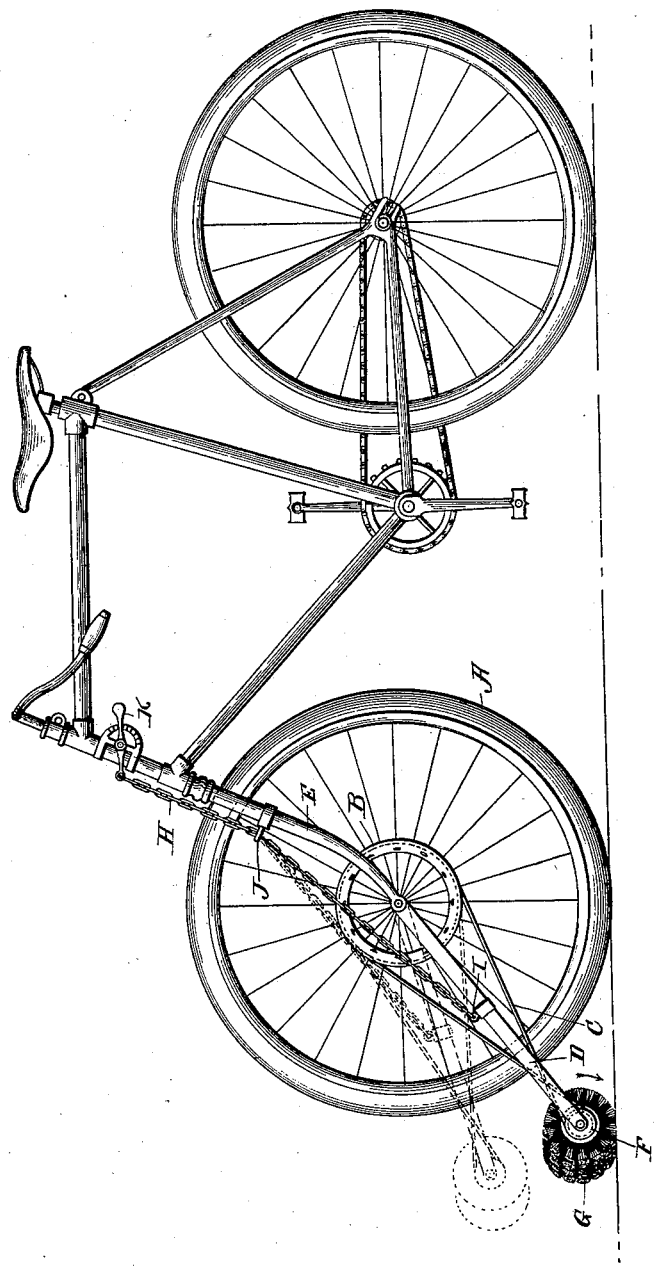
Witnesses
E. C. Wurdeman
C. S. Williamson
Inventor
George Osborne
by Geo. H. Holgate
Attorney

UNITED STATES PATENT OFFICE.

GEORGE OSBORNE, OF BROOKLYN, NEW YORK.

BICYCLE ATTACHMENT.

SPECIFICATION forming part of Letters Patent No. 599,790, dated March 1, 1898.

Application filed February 17, 1897. Serial No. 623,822. (No model.)

*To all whom it may concern:*

Be it known that I, GEORGE OSBORNE, a citizen of the United States, residing at Brooklyn, in the county of Kings and State of New York, have invented a certain new and useful Improvement in Bicycle Attachments, of which the following is a specification.

My invention relates to a new and useful improvement in attachments for bicycles and the like to remove from the road-bed immediately in front of the machine such obstructions as would be likely to injure the pneumatic tire by puncture, and has for its object to provide a simple, cheap, and effective device of this description which may be applied to any bicycle or like machine as an attachment and which when in active position will render it next to impossible for the tire to become punctured, and also to provide means for elevating the brush out of activity when its use is not desired.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawing, forming a part of this specification, in which my improvement is shown as applied to an ordinary bicycle, A being the front wheel, having secured thereon a grooved pulley B in any convenient manner, so as to revolve with the wheel and accommodate the belt C. Arms D are pivoted to the steering-fork E, concentric with the wheel, and extending forward have journaled therein the drum F, said drum having a groove formed in one end thereof for the reception of the belt C, and as this belt is crossed, as clearly shown, it is obvious that when the bicycle moves forward the drum will revolve in the direction of the arrow, and as this drum carries a brush G, adapted to move in light contact with the road-bed over which the bicycle is driven, it follows that it will sweep this road-bed immediately in front of the wheel A. In order that when the brush so acts upon the road-bed the sweepings thereof may be thrust to one side, said brush is set at a slight angle after the manner of the ordinary street-sweeper, thereby accomplishing the desired result.

A chain, cord, or wire H is attached at I to clips carried by the arms and passing upward through suitable guides J is attached to the hand-lever K, so arranged relative to a serrated segment as to permit of the elevation of the arms, and consequently the brush, by the manipulation of this lever, and by means of the segment the lever may be locked, so as to hold said brush in its elevated position, as shown in dotted lines.

Now it is obvious that a bicycle thus supplied with my attachment may be driven over a road-bed with perfect immunity from the tires being punctured, since the brush revolving in the direction of the arrow in light contact with said road-bed and immediately in advance of the front wheel of the bicycle will thrust aside small objects—such as nails, tacks, glass, sharp stones, and the like—and leave a free path for the passage of the wheels of the bicycle.

When the bicycle is used upon soft road-beds, the brush may be elevated to the position shown in dotted lines, thereby removing it from activity, as objects likely to injure the pneumatic tires of the machine will be pressed into the road-bed by the passage of the wheels, thus avoiding puncturing the tires, and when the bicycle is being trundled when the person is not mounted thereon the brush is preferably elevated to avoid contact with obstructions, as the curbing in crossing a street.

The brush may be composed of bristles, flexible wire, whalebone, cane, or other suitable material, and I do not wish to be limited to the construction of such a brush, as this might be varied without departing from the spirit of my invention. The arms D may also be made in sections, said sections being adjustable upon each other, as by telescoping, so as to alter the relative position of the brush to the road-bed, and in practice it is preferable that said brush shall just touch the road-bed when the rider is not mounted upon the machine, so that when such rider is mounted the brush will have sufficient contact with the road-bed to insure the thrusting aside of the objectionable objects.

Having thus fully described my invention, what I claim as new and useful is—

In combination with the front wheel of a bicycle, a grooved wheel secured to the spokes of the wheel, arms pivoted to the steering-fork, a brush rotatably mounted between the arms and a grooved wheel secured to the brush-axle, a belt connecting the grooved wheels, a segmental rack secured to the head of the bicycle-frame and a lever for attachment to the rack and connected with the arms, substantially as described.

In testimony whereof I have hereunto affixed my signature in the presence of two subscribing witnesses.

GEORGE OSBORNE.

Witnesses:
 HENRY N. VEDDER,
 JOHN H. CHEADLE.